(12) United States Patent
McCall et al.

(10) Patent No.: US 11,438,422 B2
(45) Date of Patent: Sep. 6, 2022

(54) ESTABLISHING CLOUD-TO-CLOUD ACCESS FOR INTERNET OF THINGS (IOT) DEVICES

(71) Applicant: Intel Corporation, Santa Clara, CA (US)

(72) Inventors: David J. McCall, Dallas, TX (US); Nathan Heldt-Sheller, Portland, OR (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/424,116

(22) PCT Filed: Feb. 14, 2020

(86) PCT No.: PCT/US2020/018311
§ 371 (c)(1),
(2) Date: Jul. 19, 2021

(87) PCT Pub. No.: WO2020/168207
PCT Pub. Date: Aug. 20, 2020

(65) Prior Publication Data
US 2022/0070267 A1 Mar. 3, 2022

Related U.S. Application Data

(60) Provisional application No. 62/805,694, filed on Feb. 14, 2019.

(51) Int. Cl.
*G06F 15/16* (2006.01)
*H04L 67/141* (2022.01)
(Continued)

(52) U.S. Cl.
CPC ............ *H04L 67/141* (2013.01); *H04L 63/08* (2013.01); *H04L 67/12* (2013.01); *G16Y 40/50* (2020.01)

(58) Field of Classification Search
CPC ....... H04L 67/141; H04L 63/08; H04L 67/12; G16Y 40/50
See application file for complete search history.

(56) References Cited

U.S. PATENT DOCUMENTS

2011/0265158 A1　10/2011　Cha et al.
2013/0203378 A1　8/2013　Vos et al.
(Continued)

FOREIGN PATENT DOCUMENTS

WO　WO-2016117940 A1　7/2016
WO　WO-2020168207 A1　8/2020

OTHER PUBLICATIONS

"International Application Serial No. PCT/US2020/018311, International Search Report dated Jun. 15, 2020", 4 pgs.
(Continued)

*Primary Examiner* — Normin Abedin
(74) *Attorney, Agent, or Firm* — Schwegman Lundberg & Woessner, P.A.

(57) ABSTRACT

Systems and methods for device to device communications in an Internet of Things (IoT) setting, via associated cloud services, are described. In an example, a procedure performed by a first IoT device, associated with a first domain or ecosystem, to communicate with a second IoT device, associated with a second domain or ecosystem, includes: obtaining communication information to communicate with a second service associated with the second device; providing the communication information to a first service associated with the first device; obtain service validation information, in response to the first service initiating the validation procedure with the second service; and providing
(Continued)

the service validation information to the first service. This service validation information is used to enable a validated connection between the first service and the second service, to then communicate data or commands between the first device and the second device via the first and second remote services.

24 Claims, 10 Drawing Sheets

(51) Int. Cl.
*H04L 9/40* (2022.01)
*H04L 67/12* (2022.01)
*G16Y 40/50* (2020.01)

(56) References Cited

U.S. PATENT DOCUMENTS

| | | | |
|---|---|---|---|
| 2013/0288645 A1* | 10/2013 | Zheng | H04W 76/14 |
| | | | 455/411 |
| 2013/0329653 A1 | 12/2013 | Russell, Jr. et al. | |
| 2019/0014117 A1* | 1/2019 | Li | H04L 65/1073 |
| 2019/0306242 A1* | 10/2019 | Thummalapalli | H04L 41/5003 |
| 2019/0349426 A1* | 11/2019 | Smith | H04L 61/2069 |

OTHER PUBLICATIONS

"International Application Serial No. PCT/US2020/018311, Written Opinion dated Jun. 15, 2020", 5 pgs.
"International Application Serial No. PCT US2020 018311, International Preliminary Report on Patentability dated Aug. 26, 2021", 7 pgs.

* cited by examiner

ESTABLISHING CLOUD-TO-CLOUD ACCESS FOR INTERNET OF THINGS (IOT) DEVICES

PRIORITY CLAIM

This application is a U.S. National Stage Application under 35 U.S.C. 371 from International Application No. PCT/US2020/018311, filed Feb. 14, 2020, published as WO 2020/168207, which claims the benefit of priority to U.S. Provisional Application Ser. No. 62/805,694, filed Feb. 14, 2019, all of which are incorporated herein by reference in their entirety.

TECHNICAL FIELD

Embodiments described herein generally relate to data communications and interconnected device networks, and in particular, to establishing connectivity, performing device provisioning, and facilitating data and command exchanges with Internet of Things (IoT) devices and services.

BACKGROUND

IoT devices are physical or virtualized objects that may communicate on a network, and may include sensors, actuators, and other input/output components, such as to collect data or perform actions from a real-world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and to enable new types of IoT network use cases. These include the specialization of communication standards distributed by groups such as Institute of Electrical and Electronics Engineers (IEEE) or Zigbee, and the specialization of application interaction architecture and configuration standards distributed by groups such as the Open Connectivity Foundation (OCF). In addition to these standards, a variety of services and applications are being actively developed and deployed in cloud service platforms and other remote computing systems, for managing data and commands exchanged with IoT devices.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
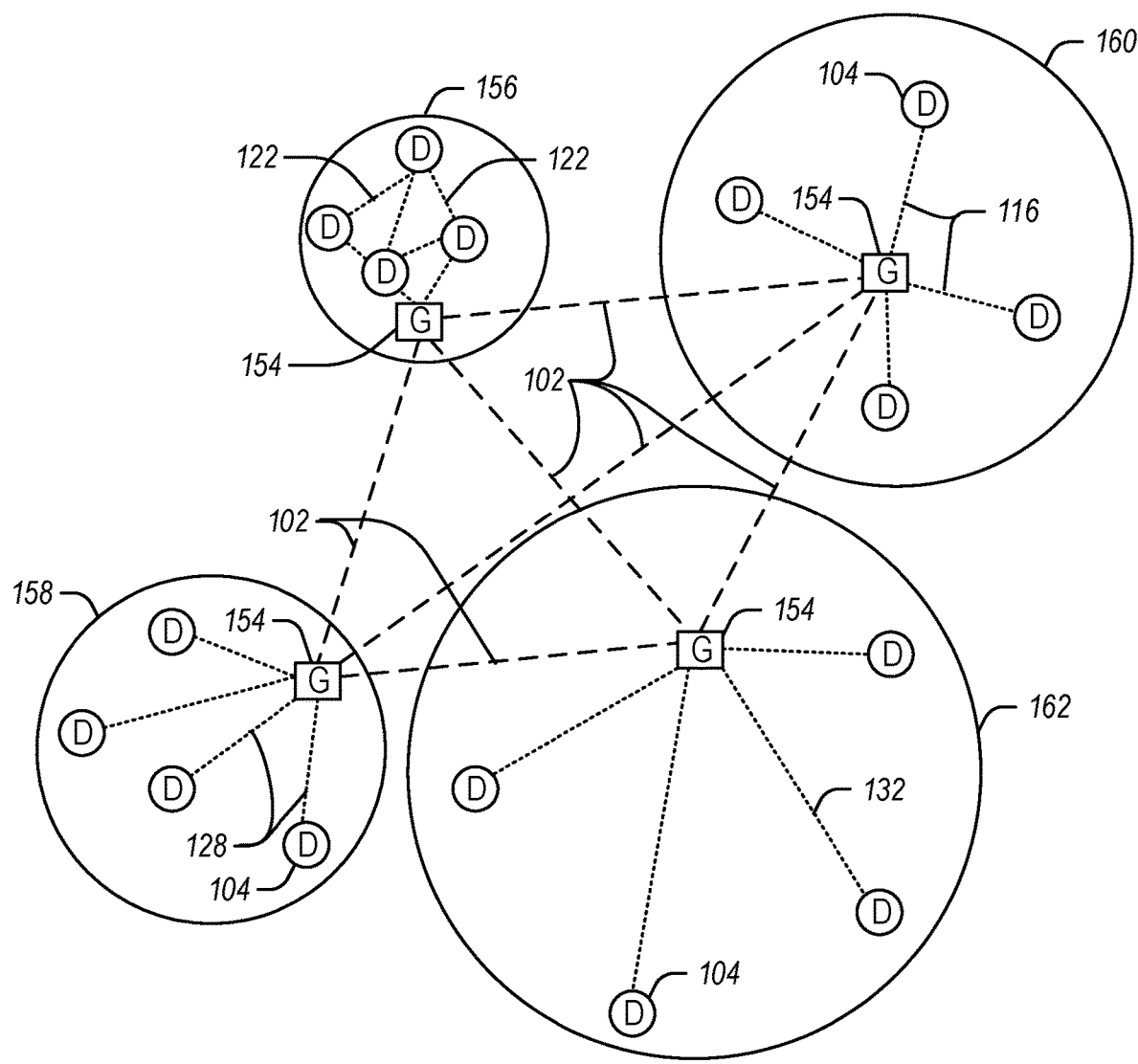
FIG. 1 illustrates a domain topology for respective internet-of-things (IoT) networks coupled through links to respective gateways, according to an example.

In the following description, methods, configurations, and related apparatuses are disclosed for implementing access and authorization for IoT device services in a multiple cloud service scenario. Specifically, the techniques enable the accessibility of various data services, functions, and APIs provided by cloud services operating in different operational domains, such as different domains hosted by different service providers or companies (e.g., between Cloud 1 hosted for/by Company A and providing device service APIs for use by a first set of IoT devices manufactured or serviced by Company A, and Cloud 2 hosted for/by Company B and providing device service APIs for use by a second set of IoT devices manufactured or serviced by Company B); or for different groups or domains of IoT established for a user, organization, or entity (e.g., a user who has sets of trusted versus guest/untrusted devices; an organization which has different groups of users; etc.).

With the present techniques and system configurations, information relevant to cloud service connectivity can be shared and validated over the local network with minimal or no user involvement. Such capabilities enable closed-loop validation of user identity, device identity and cloud service account identity to be initiated via the local network, as the loop is closed via the appropriate cloud-to-cloud connectivity established between services. Also, with the present techniques and system configurations, the necessary credentials and configurations for device-to-device and cloud-to-cloud communications and communication pathways can be automatically set up and used, without the need for a user to configure or authenticate to individual services.

The disclosed approaches provide a far easier (and, more secure) result for linking accounts and device services than conventional approaches. The disclosed approaches also enable the deployment of automated data exchanges and services, or enhanced user commands to discover or link accounts. These enhanced user commands may occur based on user prompts asking a user, "do you wish to link devices . . . ?", based on a user-selected "connect all available cloud services" option, or based on other forms of rules or client inputs. The disclosed approaches are also scalable to many types and forms of client devices, cloud services, and ecosystem entities.

Many developing IoT standards, such as those proposed by OCF, envision that devices from multiple different manufacturers will be discoverable and controllable via local network connectivity once the devices are provisioned with appropriate security information. After provisioning on a local network, such devices will also become connected to their manufacturer's or service provider's cloud services, either via proprietary protocols or cloud versions of network protocols (e.g., OCF protocols); the ability for these devices' cloud services to easily interact with each other and exchange data is also expected to be an important use case.

The following techniques provide a modification to the behavior and operation of current device-to-device and device-to-cloud communication sequences, which enables cloud-to-cloud integration among different manufacturer or service provider services. This enables different types and manufacturers of devices or service providers to have accounts and services easily linked and integrated with one another. As a result, an enhanced user experience for onboarding and provisioning devices to services, which enables cloud-to-cloud integration among a variety of different services and service types—and without the use of open authorization services (e.g., which exchange OAuth tokens) or complicated sign-in procedures—may be provided.

FIG. 1 illustrates an example domain topology for respective IoT networks coupled through links to respective gateways. The IoT supports deployments in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
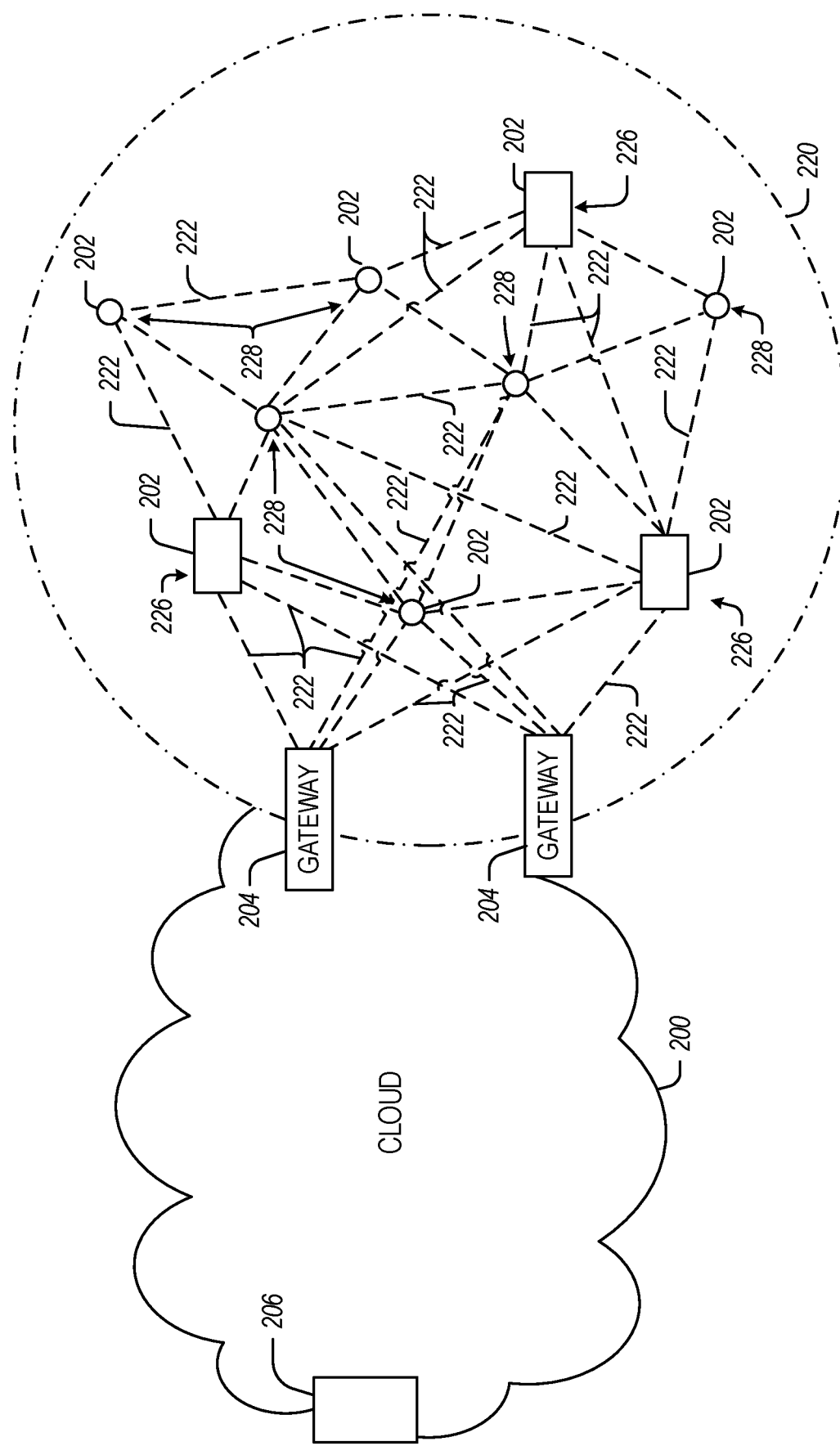
FIG. 2 illustrates a cloud computing network in communication with a mesh network of IoT devices operating as a fog system at the edge of the cloud-computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, as each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of IoT networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks integrated into "fog" or "edge cloud" devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, or vibration, into the autonomous organizations among the IoT devices. The integration of sensory systems may enable systematic and autonomous communication and coordination of service delivery against contractual service objectives, orchestration and QoS-based swarming and fusion of resources. Individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 9 and 10.

Finally, clusters of IoT devices may be equipped to communicate with other IoT devices as well as with a cloud network. This may enable the IoT devices to form an ad-hoc network between the devices, enabling them to function as a single device, which may be termed a fog device, fog platform, or fog network. This configuration is discussed further with respect to FIG. 2 below.

FIG. 2 illustrates a cloud computing network in communication with a mesh network of IoT devices (devices 202) operating as a fog system in a networked scenario. The mesh network of IoT devices may be termed a fog network 220, or edge cloud, established from a network of devices at the edge of the network. To simplify the diagram, not every IoT device 202 is labeled.

The fog network 220 may be considered to be a massively interconnected network wherein a number of IoT devices 202 are in communications with each other, for example, by radio links 222. The fog network 220 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 220 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog network 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and enabling the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, enabling communications to be maintained, even with the loss of a number of IoT devices 202. Further, the use of a mesh network may enable IoT devices 202 that are very low power or located at a distance from infrastructure to be used, as the range to connect to another IoT device 202 may be much less than the range to connect to the gateways 204.

The fog network 220 provided from these IoT devices 202 may be presented to devices in the cloud 200, such as a server 206, as a single device located at the edge of the cloud 200, e.g., a fog network operating as a device or platform. In this example, the alerts coming from the fog device may be sent without being identified as coming from a specific IoT device 202 within the fog network 220. In this fashion, the fog network 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, enabling the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog network 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog network 220 device to the server 206 to answer the query. In this example, IoT devices 202 in the fog network 220 may select the sensors 228 used based on the query, such as adding data from flow sensors or temperature sensors. Further, if some of the IoT devices 202 are not operational, other IoT devices 202 in the fog network 220 device may provide analogous data, if available.

Existing approaches for enabling interoperability between different cloud services and service providers (or different vendors of IoT products) often involve a poor or challenging user experience. For example, configuring a smart lock provided by Manufacturer/Ecosystem A to work with a smart speaker provided by Manufacturer/Ecosystem B requires manually selecting the smart lock component (e.g., a skill provided by the Manufacturer/Ecosystem A) in the smart speaker application, and then manually logging in to the user's account with Manufacturer/Ecosystem A, often via an OAuth log-in webpage.

With current approaches, multiple manual steps and menu selections, and the provision of another set of user credentials, must be coordinated by a human user. This type of account linking cannot be automated, and while it may work for limited home environments with sophisticated users, it is not scalable to mass populations or for use with large IoT deployments. While the total overhead needed for manual account linking of a small number of accounts is not significant, such manual approaches do not enable broadly shared data between services, and do not support a true web of connection that is intended by many IoT use cases.

The following examples discuss certain ways in which devices can be added into, or managed as, a larger set or family of devices, including with techniques that authenticate and establish device connections automatically and in a far simplified manner. In these examples, information regarding the composition of the set of devices may be established and exchanged with one or more tokens, which provides necessary information to perform a traversal of the IoT device network. These tokens can be passed around internally to inform the other nodes, in the foreign domain, to set up a device-to-device pathway via clouds and cloud services.

In various examples, discussion is made with reference to two devices and two domains. However, by extension, these approaches may also be applied to three or more domains, three or more devices, integration with existing domains and devices, and other variations. Thus, it will be understood that the following examples are provided with reference to two domains, but may apply to n number of domains.

Figure 3:
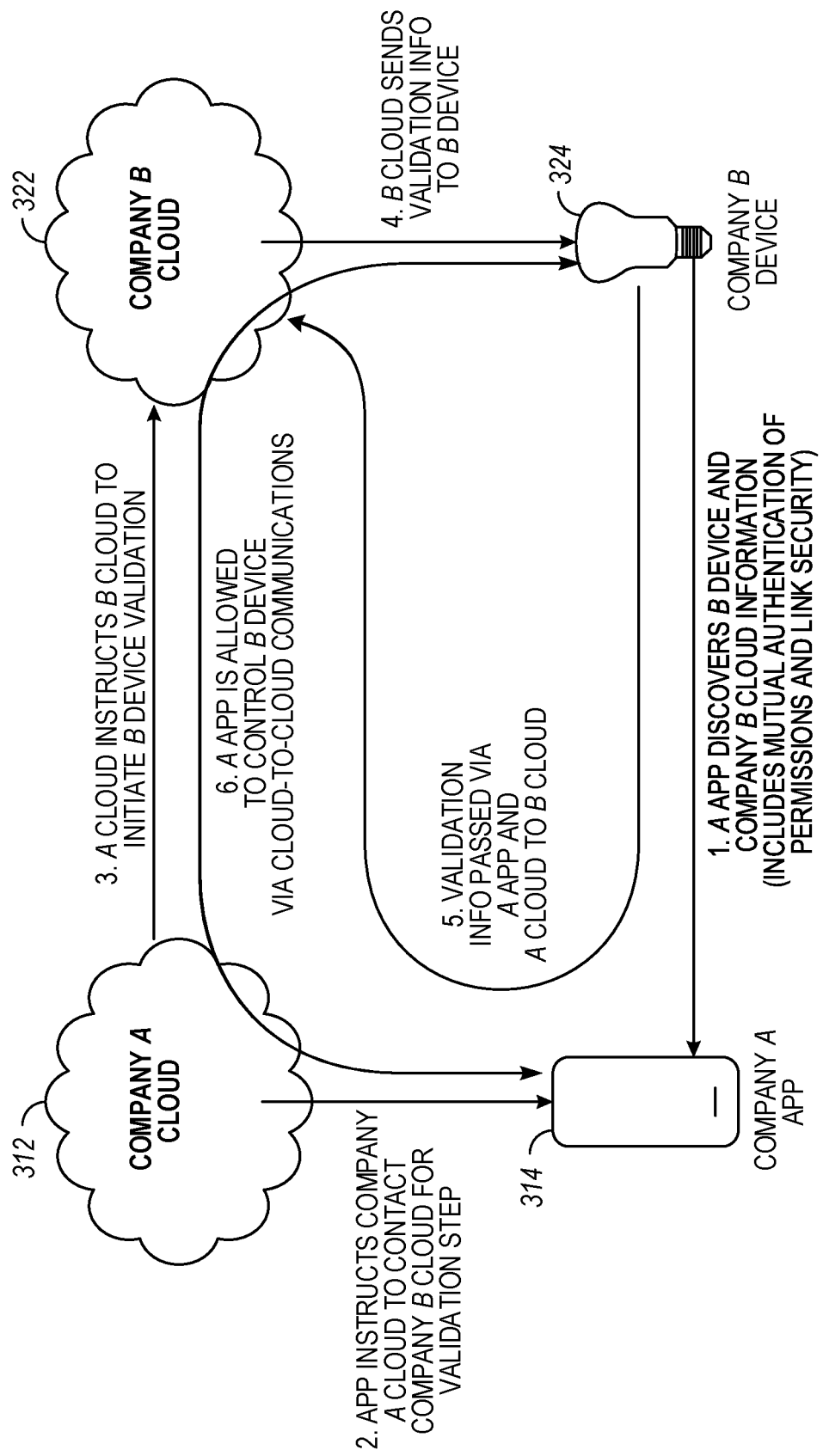
FIG. 3 illustrates an overview of a use case for automatic cloud-to-cloud device access provisioning, according to an example.

FIG. 3 provides an overview of an enhanced use case for automatic cloud-to-cloud device access provisioning. As shown, within a local device environment (e.g., an OCF device environment), a first device 314 (e.g., a smartphone app, such as a remote control application) associated with a first company or ecosystem (Company A) discovers a new second device 324 (e.g., a light bulb) that is already associated with a second company or ecosystem (Company B). This discovery (data flow (1)) includes the identification of information associated with the new device, such as device information, cloud information, security information (e.g., mutual authentication of permissions and link security), and the like.

Although cloud domains from different "companies" are illustrated in FIG. 3, it will be understood that the same principles are also applicable to differing cloud domains of any type. The different cloud domains may be established for different groups of devices associated with the same user, company, organization, or entity. Accordingly, it will be understood that the clouds and service groups discussed herein may be provided as part of a service cloud, private cloud, on-premise cloud, or other configurations. These and other configurations may involve different domains that would normally be isolated, but use the following approaches to share credentials, data, and commands.

The first device 314 then communicates with its associated cloud service 312 (Company A Cloud) (data flow (2)), with an instruction to contact a second cloud service 322 associated with the new second device 324 (Company B Cloud), and to commence validation between these cloud services (between clouds 312 and 322). This is followed by Cloud-to-Cloud communications to initiate validation (data flow (3)), and the communication of validation information (data flow (4)) which is provided back to the new second device 324.

The second device 324 then may obtain this validation information, and pass it back to the first device (via the local network connection already established in data flow (1)), which the first device 314 may then pass back to its associated cloud service (Company A Cloud) (completing data flow (5)). With the validation information having been exchanged between both clouds 312, 322, the first cloud service 312 is able to control or otherwise interact with services provided by the second cloud service 322, such as using the first device 314 to control the second device 324 via cloud-to-cloud communications (data flow (6)).

In this fashion, the procedure detailed from FIG. 3 has resulted in device-to-device (D2D) control or communications in a manner of a device-to-cloud-to-cloud-to-device (D2C2C2D). It will be apparent that other commands and data may be exchanged between devices 314 and 324 via the clouds 312 and 322, including from device 324 to device 314, after the validation information has been fully exchanged.

Figure 4:
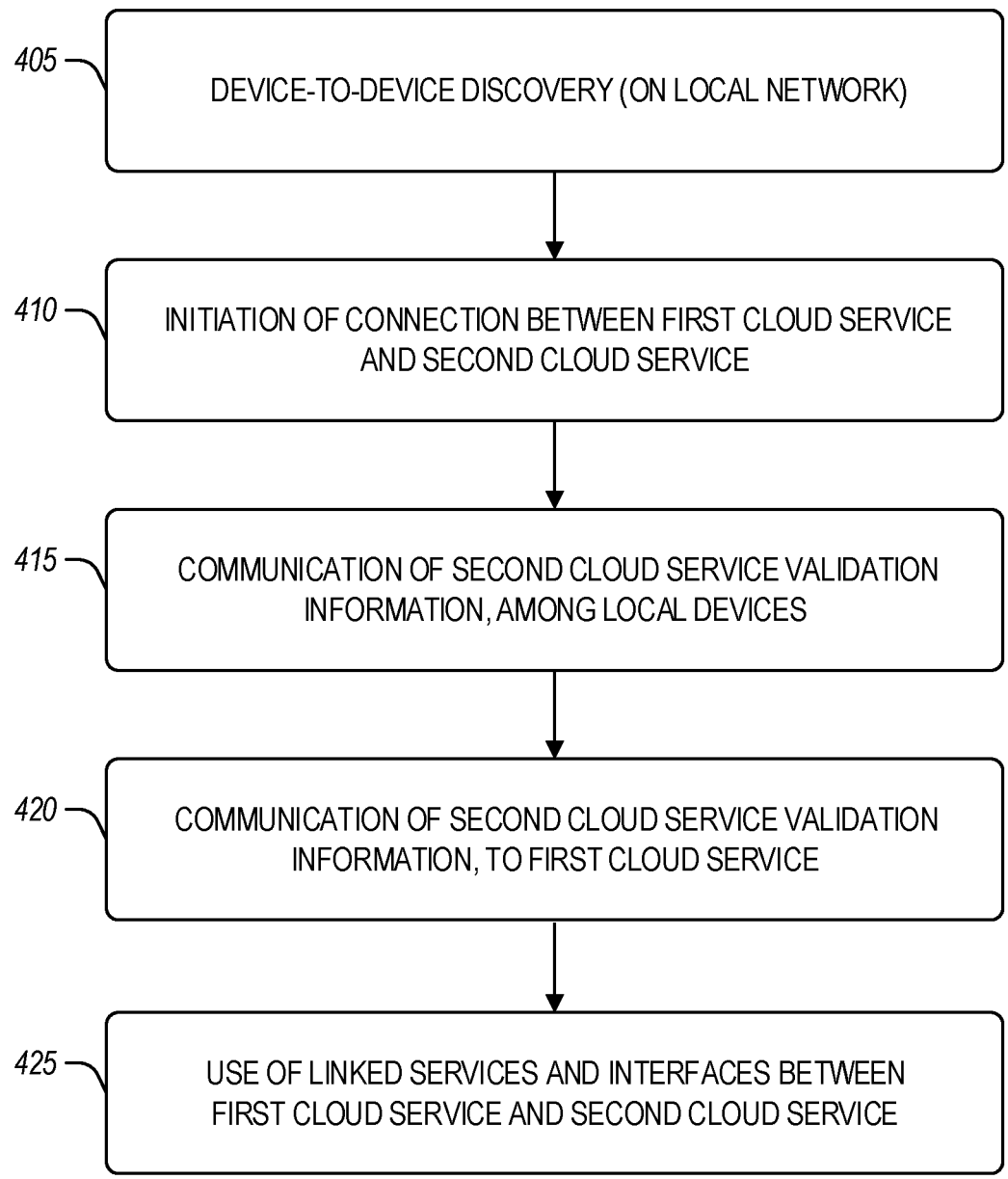
FIG. 4 illustrates a flowchart of operations for discovering and establishing cloud-to-cloud device connections, according to an example.

FIG. 4 illustrates a flowchart of a method 400 for discovering and establishing cloud-to-cloud device connections, such as in an implementation of the scenario described above for FIG. 3.

At operation 405, device-to-device discovery is performed on the local network. This may include the use of existing network protocols, discovery communications, or network provisioning (e.g., in an OCF network). This may be based on the data flow (1) depicted in FIG. 3.

At operation 410, a connection is initiated between a first cloud service and a second cloud service, such as based on instructions or information provided to the first cloud service. This may be based on the data flows (2), (3) depicted in FIG. 3.

At operation 415, validation information is communicated from the second cloud service, back to connected local devices (e.g., devices associated with the second cloud service). This may be based on the data flow (4) depicted in FIG. 3.

At operation 420, the validation information, obtained from the second cloud service, is communicated to the first cloud service, via connected local devices. This may be based on the data flow (5) depicted in FIG. 3.

At operation 425, the validation information is used within linked interfaces and services, to enable the first cloud service to communicate and control various authorized aspects, or access data, within the second cloud service. This may be based on the data flow (6) depicted in FIG. 3. In the same manner, the second cloud service may communicate and control authorized aspects, or access data, within the first cloud service.

Figure 5:
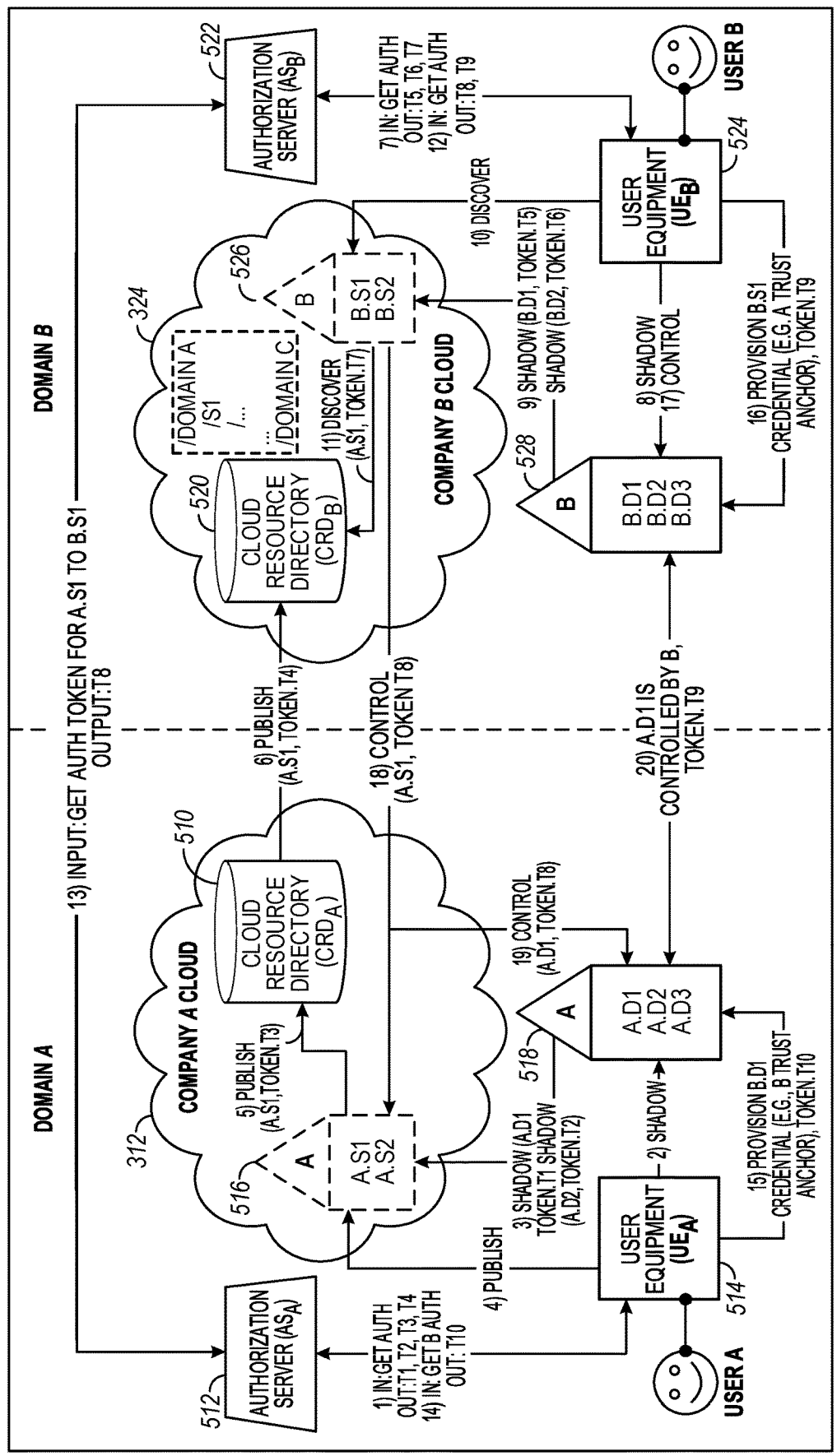
FIG. 5 illustrates a detailed overview of communications exchanged between a first domain and a second domain, for cloud-to-cloud device access provisioning, according to an example.

FIG. 5 provides a more detailed overview of communications exchanged between a first domain (including Device/User Equipment A and Cloud A) and a second domain (including Device/User Equipment B). In this scenario, each of the users (User A, User B) is a human (e.g., the same human or different humans) authorized to manage and control an IoT network within a domain context. The User Equipment (UE) is a user platform (which itself may be an IoT device) from which the user controls and manages device, networking, and domain operations. Additionally, in the example of FIG. 5, further detail is provided regarding ways in which the authentication information may be generated and exchanged, including through the use of various tokens and authorization credentials.

In the environment of FIG. 5, the Primary IoT Network (represented by house widget "A") is a local IoT network (e.g., network of connected devices that is connected via an OCF communication specification). In this example, the Primary IoT Network includes several devices within a domain (e.g. A.D1, A.D2, A.D3), operating according to an IoT specification (e.g., the OCF specification).

The Shadow IoT Network (represented by dashed house widget inside a respective cloud network) provides a software representation of physical devices contained in the IoT Network for a particular domain. Each cloud (e.g., clouds 312, 322) provides a set of domain-specific resources, functions, and services hosted by a cloud service provider, edge computing infrastructure. The domain context may be isolated using cloud tenant isolation technology such as virtualization, secure execution environment (e.g., ARM TrustZone, Intel SGX, etc.), containers, and physical partitioning.

The environment of FIG. 5 also includes various features for device discovery and authentication. This is depicted to include: a Cloud Resource Directory (CRD) 510, 520 for each domain, which is a resource directory service hosted in a cloud environment that publishes and synchronizes shadow devices visible by peer domains and hosts visible shadow devices from peer domains; and an Authorization Server (AS) 512, 522 for each domain, which is a local or cloud service that implements authorization token granting capability (e.g., using OAuth2, or any number of other authorization approaches). The tokens generated by the authorization server and communicated among the various devices may be provided in a JSON web token format, as further detailed below.

The flow of information within the environment of FIG. 5 is depicted with respective data flows as follows. The cloud environments 312, 322 described above with reference to FIG. 3 are segmented into respective domains that correspond to the company or vendor associated with each cloud (e.g., domains that correspond to devices for Company A and Company B).

In data flow (1): The user equipment controlled by User A ($UE_A$ 514) obtains authorizations to manage cloud-to-cloud provisioning and inter-operation. Authorization rights are contained within authorization tokens (e.g., tokens T1-T11) obtained from the authorization server associated with the Domain A, $AS_A$ 512. These authorizations may be initiated or controlled by the User A, by rules established by or on behalf of User A, or by software or other processes controlled or affected by the User A. The authorization tokens are utilized in the subsequent data flows.

In data flow (2): The $UE_A$ 514 instructs the IoT Network in Domain A to shadow some or all of its devices (in this example, to shadow devices A.D1, A.D2, but not A.D3) in a shadow server 516. This establishes a first set of shadowed, logical devices in the cloud environment 312 corresponding to Vendor A.

In data flow (3): The physical devices (A.D1, A.D2) on the IoT Network-A (e.g., accessible to, onboarded in, or provisioned to Domain A) request a device shadowing from the Domain-A shadow service 516. The tokens T1 and T2, obtained from the earlier data flow (1), authorize this operation.

In data flow (4): The $UE_A$ 514 instructs the shadow service A 516 to publish shadowed devices to a directory. This is followed by data flow (5): Shadow service A publishes shadowed devices using a cloud resource directory (or other device information directory), such as $CRD_A$ 510. Token T3 is used to authorize this action.

In data flow (6): $CRD_A$ 510 publishes the information for shadowed device A.S1 for consumption by a peer domain (e.g., Domain B). For example, this may involve creating an entry in another cloud resource directory, such as $CRD_B$ 520. (This entry is illustrated in FIG. 5 with the information indicated in the box next to $CRD_B$ 520).

In data flow (7): User B is notified regarding availability of devices in a peer domain, and uses the user equipment controlled by User B ($UE_B$ 524) to enable interaction between Domain A and Domain B devices (or a subset of these devices). The $UE_B$ 524 obtains authorizations to perform cloud-to-cloud interactions by obtaining authorization tokens from the authorization server associated with the Domain B, $AS_B$ 522.

In data flow (8): The $UE_B$ 524 indicates which devices associated with Domain B may be shadowed (e.g., devices B.D1, B.D2). This is followed by data flow (9): where devices B.D1, B.D2 are shadowed to a shadow service B 526 using authorization tokens T5 and T6.

In data flow (10): $UE_B$ 524 instructs the shadow service B 526 to discover new devices in the resource directory, $CRD_B$ 520. Data flow (11): shadow service B 526 discovers Domain A devices using Token T7 authorizations.

In data flow (12): $UE_B$ 524 determines it is appropriate for a Domain B device to interact with a Domain A device, and the $UE_B$ 524 obtains authorizations from the authorization server associated with the Domain B, $AS_B$ 522.

In data flow (13): The authorization server $AS_B$ 522 contacts the authorization server $AS_A$ 512 to obtain authorization, from the Domain-A, for Device A.D1 (proxied by shadow device A.S1) to interact with B.D1 (proxied by shadow device B.S1). The token T8 is used to authorize this interaction.

In data flow (14): The authorization server $AS_A$ 512 delivers the token T10 to a UE which authorizes cloud-to-cloud interaction to occur between device A.D1 and B.D1.

In data flow (15): $UE_A$ provisions credentials for B.D1 secure interactions. For example, Token T10 may contain a Domain B trust anchor which is associated with A.D1 credential resource. In data flow (16): $UE_B$ 524 likewise provisions credentials for A.D1 to conduct secure interactions, using Token T9.

In data flow (17): $UE_B$ instructs device B.D1 to interact with device A.D1. In data flow (18): Device B.D1 establishes an end-to-end or hop-by-hop connection with Device A.D1, using the shadow device B.S1 as a cloud proxy.

In data flow (19): Shadow Device A.S1 completes an end-to-end or hop-by-hop connection with Device A.D1 as its cloud proxy. In data flow (20): Device B.D1 securely interacts with Device A.D1 over the secure channel (e.g., a secure channel established via TLS, OSCORE).

Although the examples of FIGS. 3 and 5 refer to separate "companies" or ecosystem management entities, some domain use cases may be attributed to different service providers, vendors, IT organizations, or persons. Also, the use of a service or server in the depicted "cloud" does not necessarily require the use of a cloud data center or a globally accessible network. Rather, the use of a service or server may occur as part of a fog or edge computing system, such as in an edge cloud setting that hosts and isolates tenant-specific services for different users, groups of users, and other entities or entity groups.

Further, when reaching data flow (20), where direct control or data is exchanged between devices (after the underlying authentication has been set up), latency may become an issue. In particular, in IoT settings there may be latency requirements involved, which may be fulfilled with the use of a cloud edge device that is on-premises (e.g., in a cloudlet) or with a first tier edge environment using radio access network technology that has low latency properties. In other settings, latency may not be critical, or additional checks may be performed to ensure that the device-to-device connection via the clouds or via direct connections can be performed.

In an example, all authorization tokens as exchanged in the data flows of FIG. 5 or otherwise may contain user and domain context. For example, this user and domain context may be used to indicate authorization for a user login involving the UE and AS for its respective domain. An example token format may include data such as:

TABLE 1

```
{
  "TokenBody" = {
    "TokenSerialNumber" = <globally unique ID>;
    "DomainID" = "Domain X";
    "UserName" = "User X";
    ...
  }
  "Issuer" = "ASX";
  "IssuerSignature" = { . . . };
}
```

In an example, token-specific fields may include:

TABLE 2

1. Token T1: { "Device" = "A.D1"; "Rights" = "DO_SHADOW"; }
2. Token T2: { "Device" = "A.D2"; "Rights" = "DO_SHADOW"; }
3. Token T3: { "Device" = "A.S1"; "Rights" = "DO_CLOUD_PUBLISH";
}
4. Token T4: { "Device" = "A.S1"; "ToDomain" = "B"; "Rights" = "DO_CLOUD_PUBLISH";
}
5. Token T5: { "Device" = "B.D1"; "Rights" = "DO_SHADOW"; }
6. Token T6: { "Device" = "B.D2"; "Rights" = "DO_SHADOW"; }
7. Token T7: { "Device" = "B.S1"; "Rights" = "DO_CLOUD_DISCOVER"; }
8. Token T8: { "FmDomain" = "B"; "FmDevice" = "B.D1"; "ToDomain" = "A"; "ToDevice" = "A.D1"; "Rights" = "DO_CLOUD_CONTROL"; "EmbeddedToken" = <Token.T9> }
9. Token T9: { "FmDomain" = "B"; "FmDevice" = "B.D1"; "ToDomain" = "A"; "ToDevice" = "A.D1"; "Rights" = "DO_OSCORE_SESSION" }
10. Token T10: { "Device" = "A.D1"; "ToDomain" = "B"; "ToDevice" = "B.D1"; "Rights" = "ALLOW_CLOUD_CONTROL" }

Thus, in the various examples of FIG. 5, the token is signed and includes authorization data issued by an authorization server in a JSON web token format. In other examples, other forms of encodings may be used to communicate and exchange data provided by this token (e.g., in XML encoding). Also, a digital security certificate or similar security data object may be utilized to communicate the authorization data, including in scenarios where the digital certificate includes a signature from a signing entity tied to a certificate authority (CA). Other variations, including the use of CBOR web tokens, x.509 tokens embedded in a certificate, the use of asymmetric keys, and sign-on approaches such as OAuth, OAuth2, and Kerberos may be used as part of the authorization communication schemes discussed above.

As indicated above, the various devices and communications may occur according to an OCF specification, which defines various access resources, resource commands, and communication formats among devices and with cloud services. To accomplish the configuration of devices within an OCF setting, the resources utilized by an OCF implementation may include resources similar to the following:

/CRD—Contains discoverable peer domains and their shared shadow devices. Peer CRD servers may update or synchronize entries with shared resources.

/Shadow—Contains shadow resources corresponding to local domain physical devices /AS—Contains resource representation of issued authorization tokens and their status /RD—Contains references to cloud resources (/Shadow, /CRD, /AS)

Figure 6:
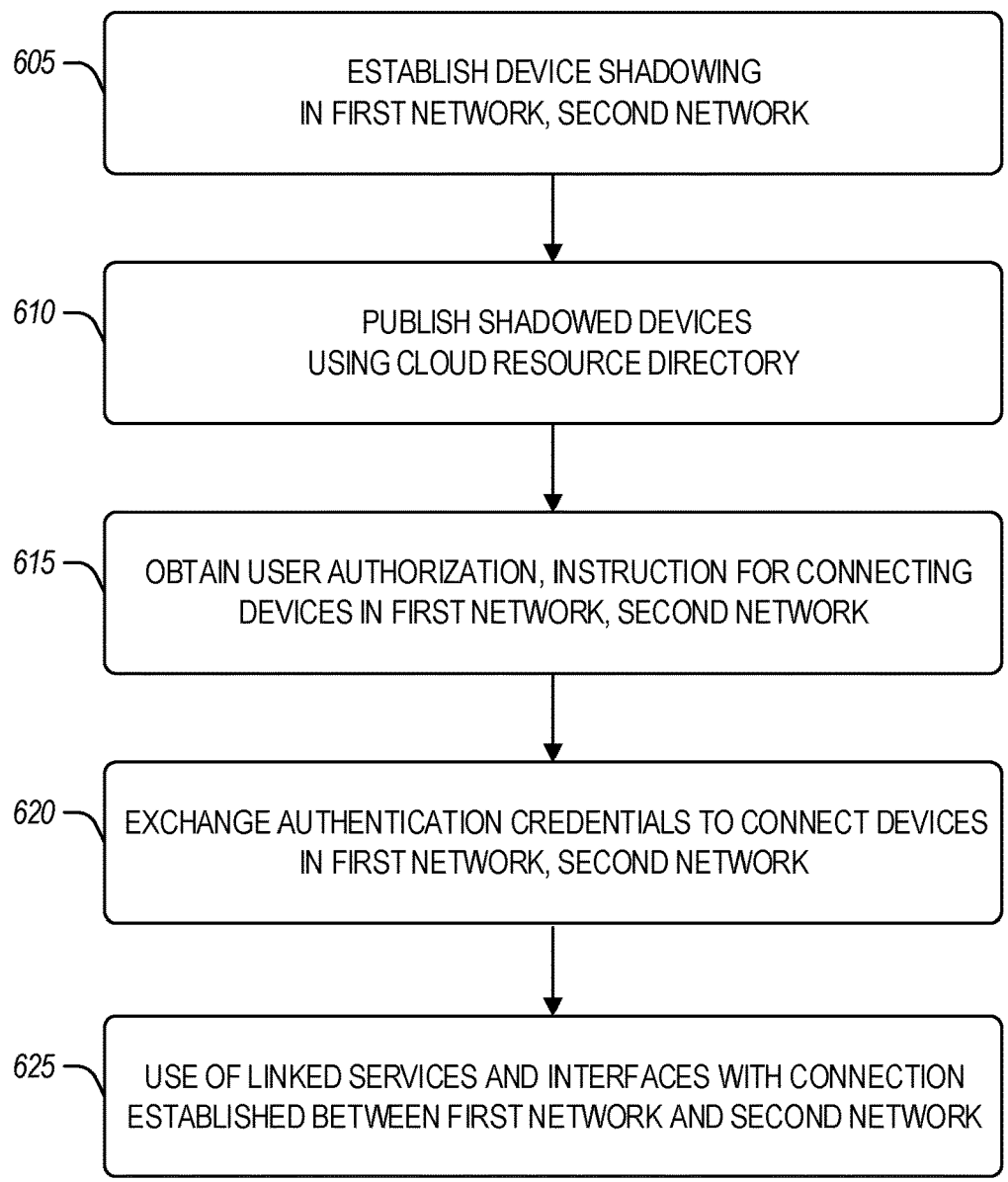
FIG. 6 illustrates a flowchart of operations for establishing and exchanging cloud-to-cloud validation information, according to an example.

FIG. 6 illustrates a flowchart 600 of a method for establishing and exchanging cloud-to-cloud validation information, such as in an implementation of the scenario described above for FIG. 5.

At operation 605, device shadowing is established in the first network and the second network. This operation may implement or may be based on the data flows (1), (2), (3), (9), depicted in FIG. 5.

At operation 610, shadowed devices are published using a cloud resource directory. This operation may implement or may be based on the data flows (4), (5), (6) depicted in FIG. 5.

At operation 615, user authorization and instruction is obtained (e.g., via a UE user input, via user pre-defined rules, commands, or data, etc.) to connect devices in the first network and the second network. This operation may implement or may be based on the data flows (7), (8), (10), (11), (12) depicted in FIG. 5.

At operation 620, authentication credentials are exchanged to connect the devices within the first network and the second network. This operation may implement or may be based on the data flows (12), (13), (14), (15), (16) depicted in FIG. 5.

At operation 625, the method concludes with the use of linked services and interfaces, using the connection established between the first network and the second network. This operation may implement or may be based on the data flows (17), (18), (19) depicted in FIG. 5.

Accordingly, the data flow and operational sequences illustrated among FIGS. 3 to 6, discussed above, provides a Device-to-Cloud-to-Cloud-to-Device (D2C2C2D) access model. The security model allows for both hop-by-hop and end-to-end message protection capability which logically is device-to-device. Even though some D2D physical connections are possible and the domains may be physically co-located, the D2C2C2D approach is followed for security because the interaction semantics remain as defined by Domains A and B.

It will also be understood that edge computing infrastructure is being designed to overcome latency issues common to cloud services. Even with the use of edge computing infrastructure, the presently described D2C2C2D approach is still feasible even when networks are physically co-located; the latency inherent with remote cloud services may be replaced with reduced latency from edge cloud services.

Finally, it will be understood that many of the cloud-to-local interactions discussed above are inferred, such as when all cloud services are represented as OCF resources. This suggests many of the local-to-cloud interactions may be supported using traditional OCF discovery and interaction protocols.

In further examples, the domains established above may be applicable to settings involving Industrial IoT networks. Such networks often have multi-tier networking, so a respective "domain" discussed above may relate to one of these tiers. Likewise, in examples involving network or device tiers, the domains may be established within a respective tier, where at each tier there is potentially a policy that is appropriate for the tier, as the policy control or device properties applied are additive.

In further examples, the implementations discussed here may be applied in smart cities, including the use of smart cities involving multiple tiers. In these and other settings, the implementations discussed herein may also apply to edge cloud/edge computing deployments, in variety of edge computing environments, and the use of multi-access edge computing (MEC) arrangements for wired and wirelessly connected devices.

Figure 7:
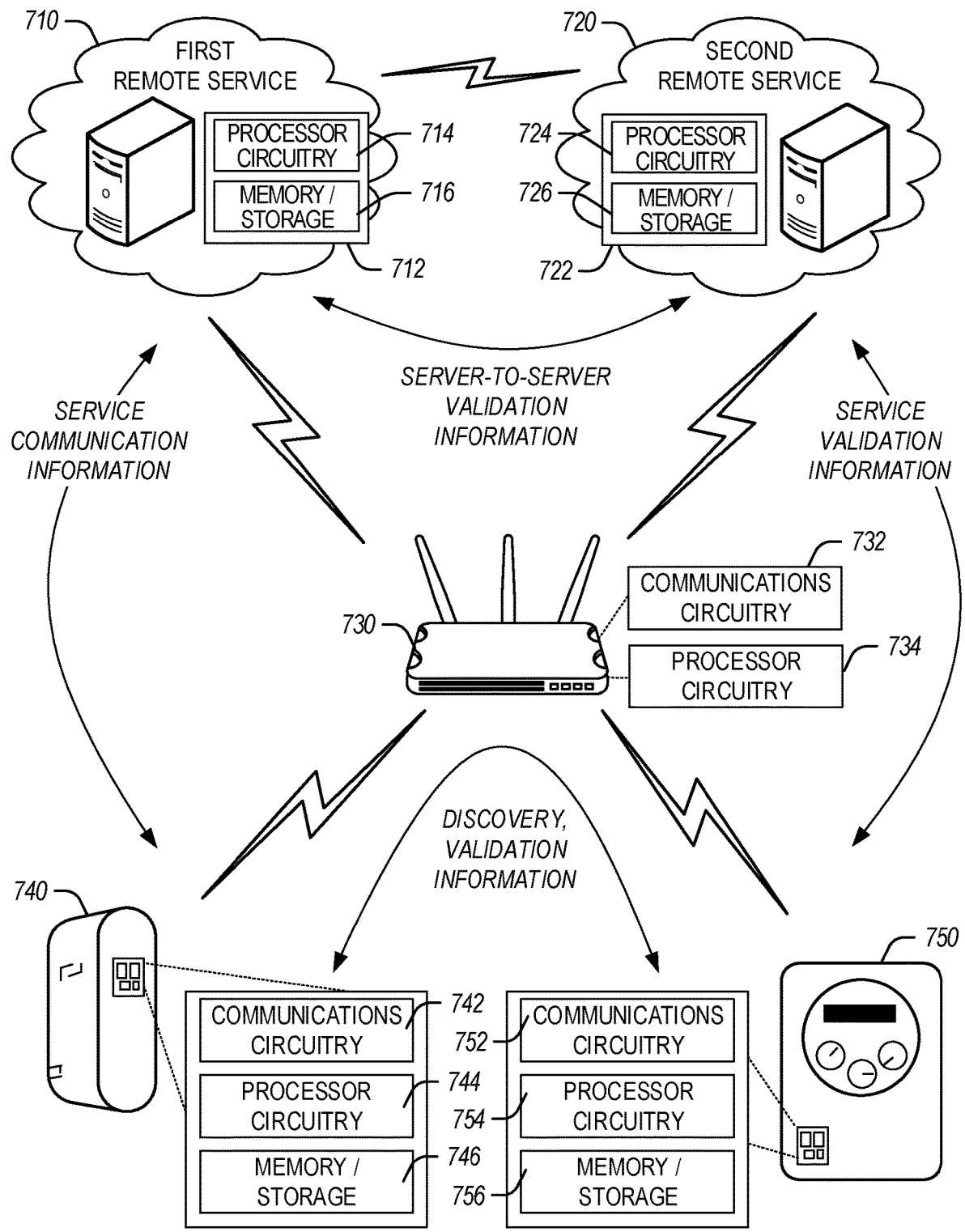
FIG. 7 illustrates a diagram of device and apparatus configurations for implementing automatic cloud-to-cloud registration and validation techniques, according to an example.

FIG. 7 illustrates a diagram of device and apparatus configurations for implementing automatic cloud-to-cloud registration and validation techniques. In this diagram, selected structural components (processors, memory, etc.) are used to implement the various operations detailed above, as part of establishing connectivity between a first IoT device 740 (associated with a first remote service 710) and a second IoT device 750 (associated with a second remote service 720). However, it will be understood that far more devices, systems, components, and communications may be provided within an IoT device deployment.

The first IoT device 740 is depicted as including communications circuitry 742 (e.g., a network interface card), processor circuitry 744 (e.g., one or more processors or processor cores), and a memory or storage device 746 (e.g., a volatile or non-volatile memory array), as the device 740 is adapted to perform device-to-device communications via the remote service based on the configurations and operations discussed herein. In an example, the communications circuitry 742 is configured to perform communications with the second IoT device 750, directly or via a communications gateway 730; and to perform communications with the first remote service 710, directly or via the communications gateway 730.

In an example, the memory or storage device 746 includes instructions embodied thereon, and the instructions, when executed by the processing circuitry, configure the processing circuitry to perform operations for configuring and establishing the device-to-device communications pathway via the remote services. Further details on these operations is detailed in the operations of FIG. 8, discussed below; or other data flows detailed in FIGS. 3 to 6. It will be understood that these operations include the exchange of discovery and validation information between the devices 740 and 750, and the exchange of service communication information between the service 710 and the device 740.

The second IoT device 750 is depicted as including communications circuitry 752, processor circuitry 754, and a memory or storage device 746, as the device 750 is also adapted to perform the corresponding operations to interact and communicate with the first IoT device 740 and the second remote service 720. Further details on the operations is also detailed in the operations of FIG. 8, discussed below; or other data flows detailed in FIGS. 3 to 6. It will be understood that these operations include the exchange of discovery and validation information between the devices 740 and 750, and service validation information between the service 720 and the device 750.

The first remote service 710 is depicted as including a server 712 with processor circuitry 714 and memory or storage 716; the second remote service 720 is depicted as including a server 722 with processor circuitry 724 and memory/storage 726. The respective processor circuitry and memory or storage may operate within each server to facilitate the communications and authentication information, as detailed in the operations of FIG. 8, discussed below; or other data flows detailed in FIGS. 3 to 6. Specifically, a data connection between the services 710, 720 may be used to exchange validation information to set up an authenticated service-to-service connection, and later to provide or communicate data commands or data values in a cloud-to-cloud manner.

The communications gateway 730 may be located within a local area network that includes the devices 740, 750, as a bridge between the local area network and a wide area network, or in a wide area network, between the devices 740, 750 and the services 710, 720. In an example, the communications gateway 730 includes communication circuitry 732 to conduct communications (e.g., wired or wireless communications) and processor circuitry 734 to execute instructions for performing communication or compute operations. Other components (such as memory or storage, not shown) may be used to filter or enhance communications between the devices 740, 750 and the services 710, 720. The communications gateway 730 may perform or assist the operations detailed in FIG. 8, discussed below, or the data flows detailed in FIGS. 3 to 6.

Figure 8:
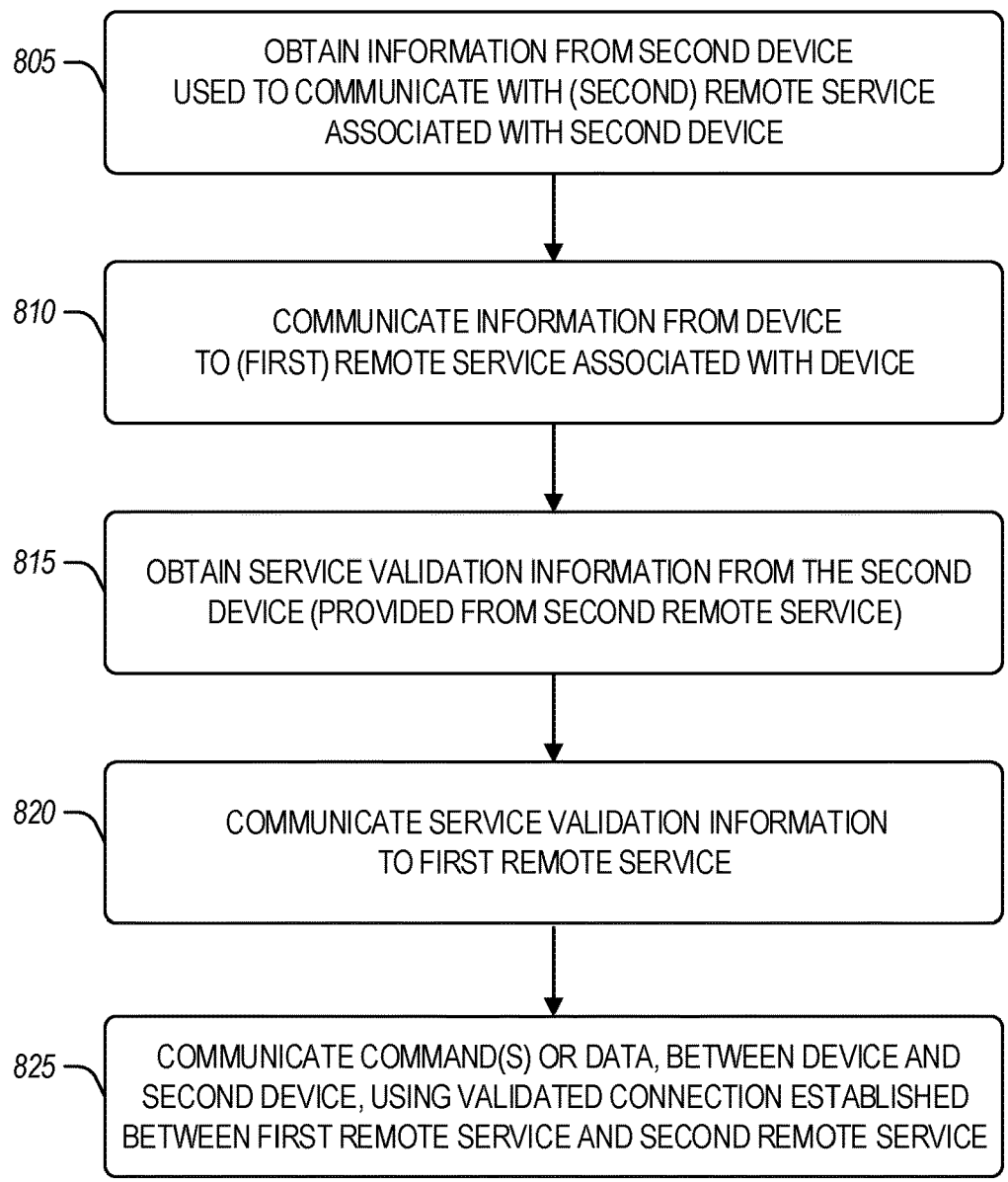
FIG. 8 illustrates a flowchart of operations for implementing automatic cloud-to-cloud registration and validation techniques, according to an example.

FIG. 8 illustrates a flowchart 800 of operations for implementing automatic cloud-to-cloud registration and validation techniques, according to an example. These operations are described from the perspective of a first device, although it will be understood that other perspectives may be implemented.

The flowchart 800 begins with an operation to obtain, from a second device, various information used to communicate with a second, remote service associated with the second device (operation 805). This information may be obtained in response to discovery of the second device on a local area network. For instance, the information obtained from the second device may include information to mutually authenticate permissions and establish communication link security between the devices, between cloud services, or otherwise.

The flowchart 800 continues with an operation to communicate information to a first remote service associated with the first device (operation 810). In an example, the first remote service is hosted in a first cloud network associated with a first entity, and the second remote service is hosted in a second cloud network associated with a second entity. In this configuration, the first device is associated with the first entity, and the second device is associated with the second entity. For example, the first device may be manufactured by or serviced on behalf of the first entity, and the second device may be manufactured by or serviced on behalf of the second entity. Also in an example, the communications performed with the first remote service are performed via a wide area network. These communications may include at least one token, or the token information discussed above, such as where the token includes data that provides authentication information obtained from an authorization server.

The flowchart 800 continues with an operation to obtain service validation information from the second device (operation 815). Earlier, this service validation information is provided from a second remote service, such as in a scenario where the second remote service provides the service validation information to the second device in response to the first remote service initiating the validation procedure with the second remote service. Thus, the service validation information may be provided as a result of a first phase of service-to-service authentication. In an example, this service-to-service authentication may involve use of a directory, such as where the first remote service maintains a first directory of devices accessible to the second remote service, and the second remote service maintains a second directory of devices accessible to the first remote service. In these examples, which may involve use of the shadow devices discussed above, the first directory of devices may provide data associated with the first device, and the second directory of devices may provide data associated with the second device; the service validation information is then provided based on one or both of the first and second directory of devices.

The flowchart 800 then continues with an operation to communicate the service validation information from the first device to the first remote service (operation 820). In further examples, this and the other communications from the first device to the first remote service include at least one token, with the token including data to provides authentication information obtained from an authorization server (e.g., as depicted in detail in FIG. 5). Based on this information, a validated service-to-service connection (and, device-to-cloud service-to-cloud service-to-device connection) may be established.

The flowchart 800 concludes with an operation to communicate one or more commands or data, using the validated service-to-service connection (operation 825). For instance, in response to communicating the command, the command is further communicated from the first remote service to the second remote service and from the second remote service to the second device, using the validated connection between the first remote service and the second remote service. Also for instance, in response to a request for the data value, the request is further communicated from the first remote service to the second remote service and from the second remote service to the second device, and is returned from the second device to the second remote service and to the first remote service, using the validated connection between the first remote service and the second remote service.

In an example, the first remote service provides various authentication information that accompanies data or commands to the second remote service, and the validated connection between the first remote service and the second remote service is established based on use of the authentication information. This authentication information may be provided as discussed in FIGS. 3 and 5, above. Also in further examples, various forms of user input may be received at the respective IoT devices, or at user equipment which manages a respective IoT device. Thus, various flows may occur where the service validation information is provided to the first device in response to user input at the second device. Other automated discover and connection setup may also occur.

In various examples, the present subject matter and features discussed above may be embodied by various methods, devices, and system embodiments. As a first example, an embodiment may include a method, device, system, or network, which enables interaction with or manages data in a cloud-to-cloud resource directory (e.g., directories 510, 520), using the techniques discussed with reference to FIGS. 3 to 8. Such directories may be updated or managed using the data flows and authorization information exchanged as discussed above.

As a second example, an embodiment may include a method, device, system, or network, which enables cloud-to-local resource directory interaction, including processing features for when a device is cloud-capable (or, cloud-resource-directory capable), using the techniques discussed with reference to FIGS. 3 to 8.

As a third example, an embodiment may include a method, device, system, or network, which enables OAuth authorization of Cloud-to-Cloud interaction, based on the use of OAuth or OAuth tokens in combination with the techniques discussed with reference to FIGS. 3 to 8.

As a fourth example, an embodiment may include a method, device, system, or network, which enables discovering, over a Local Network, the availability for Cloud-to-Cloud Interaction (for a device already configured for Cloud-to-Local Interaction), using the techniques discussed with reference to FIGS. 3 to 8.

As a fifth example, an embodiment may include a method, device, system, or network, which enables setup and execution of an application, service, or data structure for any of the Cloud-to-Cloud resource directory, Cloud-to-Cloud interaction, or Cloud-to-Local interaction approaches, provided from the techniques discussed with reference to FIGS. 3 to 8.

As a sixth example, an embodiment may include a method, device, system, or network, which enables automatic, user-assisted, or user-configured provisioning of authorized and secure cross-cloud interaction (D2D or D2C2C2D) scenarios. These scenarios may leverage already secure D2D configurations, using the techniques discussed with reference to FIGS. 3 to 8, thus avoiding the need for user-involved OAuth or like authorization approaches.

Figure 9:
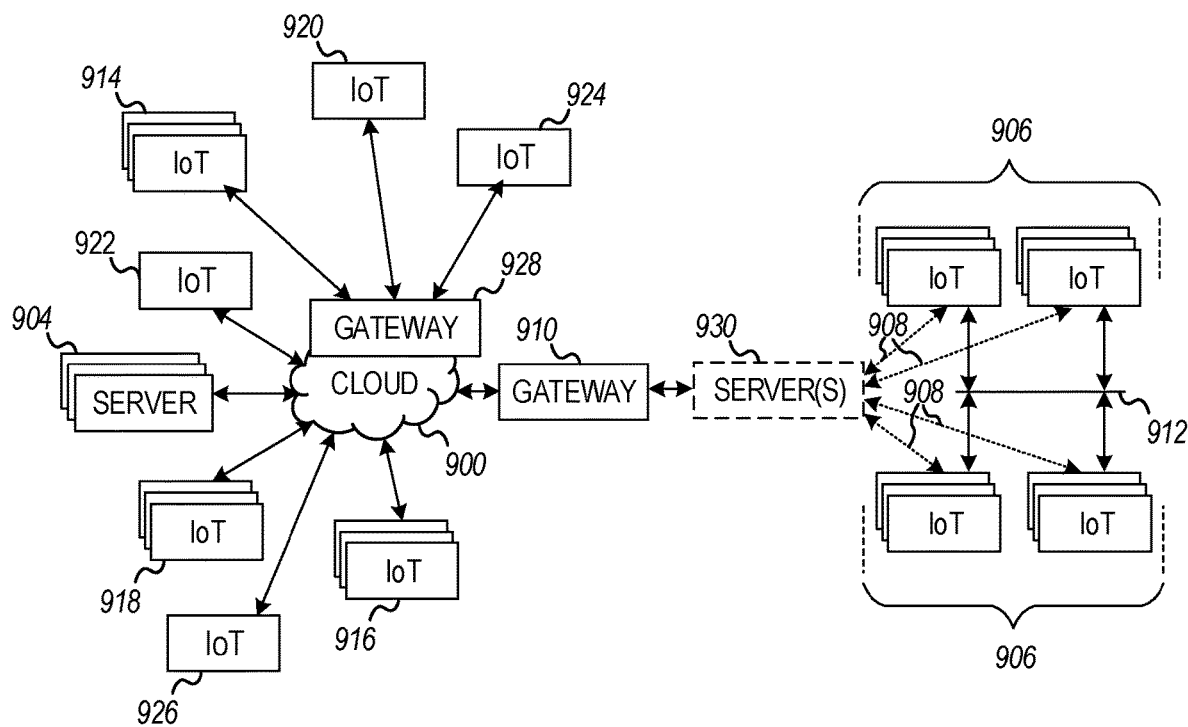
FIG. 9 illustrates a block diagram of a network illustrating communications among a number of IoT devices, according to an example.

FIG. 9 illustrates a drawing of a cloud computing network, or cloud 900, in communication with a number of Internet of Things (IoT) devices. The cloud 900 may represent the Internet, or may be a local area network (LAN), or a wide area network (WAN), such as a proprietary network for a company. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 910 or 928 to communicate with remote locations such as the cloud 900; the IoT devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various IoT devices 914, 920, 924 being constrained or dynamic to an assignment and use of resources in the cloud 900.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog platform or system (not shown), or a combination therein. The groups of IoT devices may be deployed in various residential, commercial, and industrial settings (including in both private or public environments).

As may be seen from FIG. 9, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog platform or system.

Figure 10:
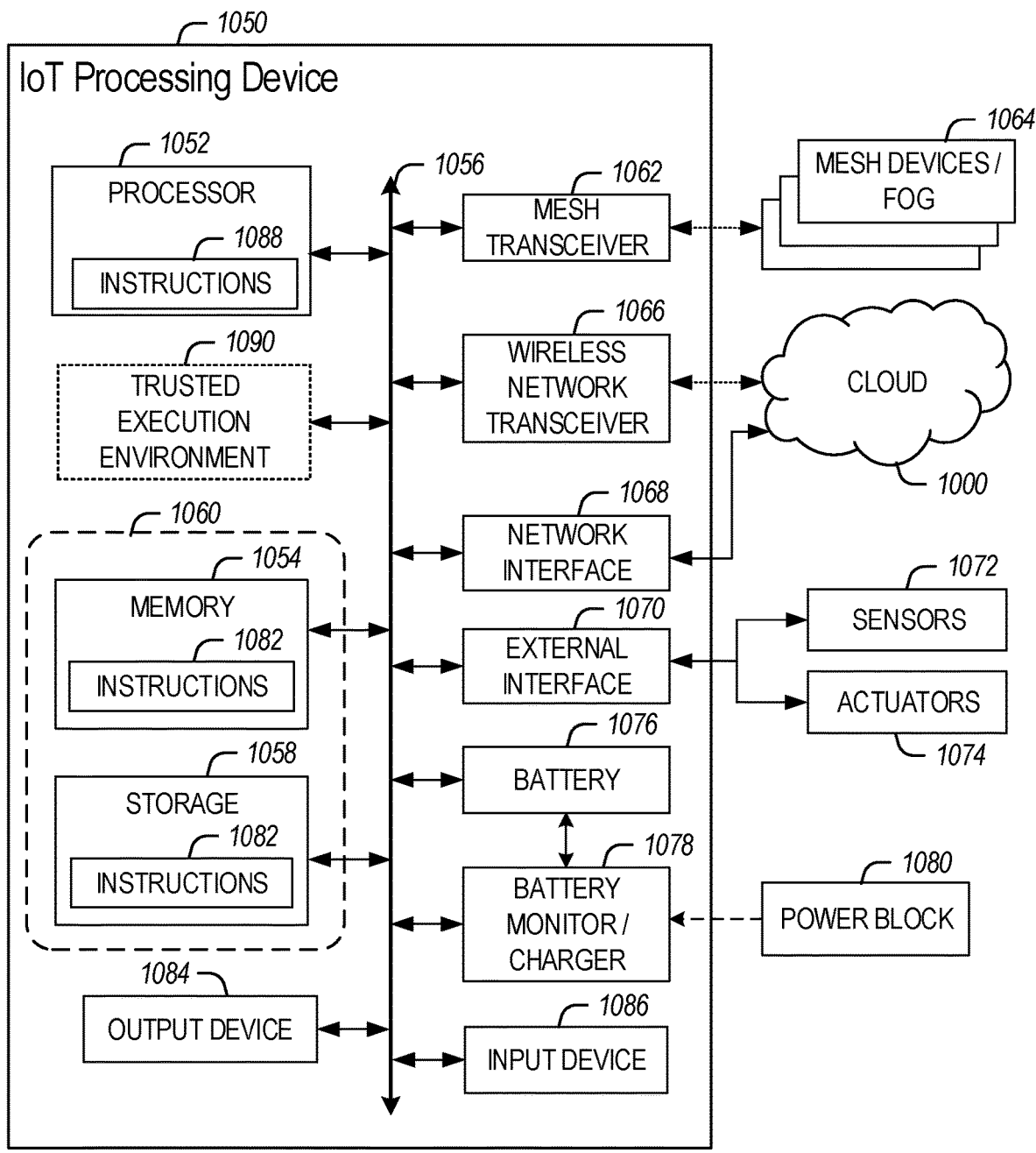
FIG. 10 illustrates a block diagram for an example IoT processing system architecture upon which any one or more of the techniques (e.g., operations, processes, methods, and methodologies) discussed herein may be performed, according to an example.

FIG. 10 is a block diagram of an example of components that may be present in an IoT device 1050 for implementing the techniques described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 10 is intended to depict a high-level view of components of the IoT device 1050. However, some of the components shown may be omitted, additional components may be present, and different arrangement of the components shown may occur in other implementations.

The IoT device 1050 may include processing circuitry in the form of a processor 1052, which may be a microprocessor, a multi-core processor, a multithreaded processor, an ultra-low voltage processor, an embedded processor, or other known processing elements. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, a Xeon™, an i3, an i5, an i7, an i9, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc. Accordingly, in various examples, applicable means for processing may be embodied by such processing circuitry.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others. Accordingly, in various examples, applicable means for storage may be embodied by such storage media.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 1002.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1062, 1066, 1068, or 1070. Accordingly, in various examples, applicable means for communicating (e.g., receiving, transmitting, etc.) may be embodied by such communications circuitry.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may be embodied by devices described for the storage 1058 of FIG. 10 or may include specific storage units such as optical disks, flash drives, or any number of other hardware devices. The non-transitory, machine readable medium 1060 may include instructions to direct the processor 1052 to perform a specific sequence or flow of actions, for example, as described with respect to the flowchart(s) and block diagram(s) of operations and functionality depicted above.

In still a specific example, the instructions 1088 on the processor 1052 (separately, or in combination with the instructions 1088 of the machine readable medium 1060) may configure execution or operation of a trusted execution environment (TEE) 1090. In an example, the TEE 1090 operates as a protected area accessible to the processor 1052 for secure execution of instructions and secure access to data. Various implementations of the TEE 1090, and an accompanying secure area in the processor 1052 or the memory 1054 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1050 through the TEE 1090 and the processor 1052.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a device, comprising: processing circuitry; communications circuitry configured to: perform communications with a second device; and perform communications with a first remote service associated with the device; and a memory device including instructions embodied thereon, wherein the instructions, which when executed by the processing circuitry, configure the processing circuitry to perform operations to: obtain information, from the second device, to communicate with a second remote service associated with the second device; provide the information, from the device to the first remote service, wherein in response to the information the first remote service initiates a validation procedure with the second remote service; obtain service validation information from the second device, wherein the service validation information is provided from the second remote service to the second device in response to the first remote service initiating the validation procedure with the second remote service; and provide the service validation information from the device to the first remote service, wherein the service validation information is used by the first remote service to enable a validated connection between the first remote service and the second remote service, wherein the validated connection is established to communicate data or commands between the device and the second device via the first and second remote services.

In Example 2, the subject matter of Example 1 optionally includes the instructions further to configure the processing circuitry to perform operations to: provide a command from the device to the second device, via the first remote service and the second remote service, by communicating the command from the device to the first remote service, wherein, in response to communicating the command, the command is further communicated from the first remote service to the second remote service and from the second remote service to the second device, using the validated connection between the first remote service and the second remote service.

In Example 3, the subject matter of any one or more of Examples 1-2 optionally include operations to: obtain a data value from the second device, via the first remote service and the second remote service, by communicating a request for the data value from the device to the first remote service, wherein, in response to the request for the data value, the request is further communicated from the first remote service to the second remote service and from the second remote service to the second device, and is returned from the second device to the second remote service and to the first remote service, using the validated connection between the first remote service and the second remote service.

In Example 4, the subject matter of any one or more of Examples 1-3 optionally include subject matter where the first remote service is hosted in a first cloud network associated with a first entity, and wherein the second remote service is hosted in a second cloud network associated with a second entity, wherein the device is associated with the first entity, and wherein the second device is associated with the second entity.

In Example 5, the subject matter of Example 4 optionally include subject matter where the device is manufactured by or serviced on behalf of the first entity, and wherein the second device is manufactured by or serviced on behalf of the second entity.

In Example 6, the subject matter of any one or more of Examples 1-5 optionally include subject matter where the first remote service further provides authentication information that accompanies data or commands to the second remote service, wherein the validated connection between the first remote service and the second remote service is established based on use of the authentication information.

In Example 7, the subject matter of any one or more of Examples 1-6 optionally include subject matter where the information is provided to the first remote service in response to user input received at the device, and wherein the service validation information is provided to the device in response to user input at the second device.

In Example 8, the subject matter of any one or more of Examples 1-7 optionally include subject matter where the first remote service maintains a first directory of devices accessible to the second remote service, the first directory of devices including data associated with the device, wherein the second remote service maintains a second directory of devices accessible to the first remote service, the second directory of devices including data associated with the second device, and wherein the service validation information is provided based on at least one of the first and second directory of devices.

In Example 9, the subject matter of any one or more of Examples 1-8 optionally include subject matter where communications from the device to the first remote service include at least one token, wherein the at least one token includes data that provides authentication information obtained from an authorization server.

In Example 10, the subject matter of any one or more of Examples 1-9 optionally include subject matter where the communications performed with the second device are performed via a local area network, and wherein the communications performed with the first remote service are performed via a wide area network.

In Example 11, the subject matter of Example 10 optionally include subject matter where the operations to obtain the information from the second device to communicate with the second remote service, are performed in response to discovery of the second device on the local area network, wherein the information obtained from the second device includes information to mutually authenticate permissions and establish communication link security.

In Example 12, the subject matter of any one or more of Examples 1-11 optionally include subject matter where the device and the second device communicate according to a standard defined according to an Open Connectivity Foundation (OCF) specification, and wherein the communications performed by the operations occur according to asynchronous messages between respective devices and services.

Example 13 is a method for establishing communications in an Internet of Things (IoT) device deployment, comprising operations performed by processing circuitry of an IoT device, the operations including: obtain information, from a second IoT device, to communicate with a second remote service associated with the second IoT device; provide the information to a first remote service, wherein in response to the information the first remote service initiates a validation procedure with the second remote service; obtain service validation information from the second IoT device, wherein the service validation information is provided from the second remote service to the second IoT device in response to the validation procedure; and provide the service validation information to the first remote service, to enable a validated connection between the first remote service and the second remote service to communicate data or commands between the IoT device and second device via the first and second remote services.

In Example 14, the subject matter of Example 13 optionally includes: providing a command from the IoT device to the second IoT device, via the first remote service and the second remote service, by communicating the command from the IoT device to the first remote service, wherein, in response to communicating the command, the command is further communicated from the first remote service to the second remote service and from the second remote service to the second IoT device, using the validated connection between the first remote service and the second remote service.

In Example 15, the subject matter of any one or more of Examples 13-14 optionally include: obtaining a data value from the second IoT device, via the first remote service and the second remote service, by communicating a request for the data value from the IoT device to the first remote service, wherein, in response to the request for the data value, the request is further communicated from the first remote service to the second remote service and from the second remote service to the second IoT device, and is returned from the second IoT device to the second remote service and to the first remote service, using the validated connection between the first remote service and the second remote service.

In Example 16, the subject matter of any one or more of Examples 13-15 optionally include subject matter where the first remote service is hosted in a first cloud network associated with a first entity, and wherein the second remote service is hosted in a second cloud network associated with a second entity, wherein the IoT device is associated with the first entity, and wherein the second IoT device is associated with the second entity.

In Example 17, the subject matter of Example 16 optionally include subject matter where the IoT device is manufactured by or serviced on behalf of the first entity, and wherein the second IoT device is manufactured by or serviced on behalf of the second entity.

In Example 18, the subject matter of any one or more of Examples 13-17 optionally include subject matter where the first remote service further provides authentication information that accompanies data or commands to the second remote service, wherein the validated connection between the first remote service and the second remote service is established based on use of the authentication information.

In Example 19, the subject matter of any one or more of Examples 13-18 optionally include subject matter where the information is provided to the first remote service in response to user input received at the IoT device, and wherein the service validation information is provided to the IoT device in response to user input at the second IoT device.

In Example 20, the subject matter of any one or more of Examples 13-19 optionally include subject matter where the first remote service maintains a first directory of devices accessible to the second remote service, the first directory of devices including data associated with the IoT device, wherein the second remote service maintains a second directory of devices accessible to the first remote service, the second directory of devices including data associated with the second IoT device, and wherein the service validation information is provided based on at least one of the first and second directory of devices.

In Example 21, the subject matter of any one or more of Examples 13-20 optionally include subject matter where communications from the IoT device to the first remote service include at least one token, wherein the at least one token includes data that provides authentication information obtained from an authorization server.

In Example 22, the subject matter of any one or more of Examples 13-21 optionally include subject matter where the communications performed with the second IoT device are performed via a local area network, and wherein the communications performed with the first remote service are performed via a wide area network.

In Example 23, the subject matter of Example 22 optionally include subject matter where the operations to obtain the information from the second IoT device to communicate with the second remote service, are performed in response to discovery of the second IoT device on the local area network, wherein the information obtained from the second IoT device includes information to mutually authenticate permissions and establish communication link security.

In Example 24, the subject matter of any one or more of Examples 13-23 optionally include subject matter where the IoT device and the second IoT device communicate according to a standard defined according to an Open Connectivity Foundation (OCF) specification, and wherein the communications performed by the operations occur according to asynchronous messages between respective devices and services.

Example 25 is at least one machine-readable storage device comprising instructions stored thereupon, which when executed by processing circuitry of an apparatus, cause the processing circuitry to perform any of the operations of Examples 13 to 24.

Example 26 is a system, comprising: a first Internet of Things (IoT) device, comprising processing circuitry, communications circuitry, and at least one memory device, the processing circuitry configured to cause the first IoT device to: receive information, from a second IoT device, to communicate with a second remote service associated with the second IoT device; transmit the information, from the first IoT device to a first remote service, wherein in response to the information the first remote service contacts the second remote service to initiate a validation procedure; receive service validation information from the second IoT device, wherein the service validation information is provided from the second remote service to the second IoT device in response to the first remote service contacting the second remote service to initiate the validation procedure; and transmit the service validation information from the first IoT device to the first remote service, wherein the service validation information is used by the first remote service to enable a validated connection between the first remote service and the second remote service, wherein the validated connection is established to communicate data or commands between the first IoT device and the second IoT device via the first and second remote services.

In Example 27, the subject matter of Example 26 optionally includes an authorization server, in communication with the first IoT device, the authorization server to provide at least one authentication token used for establishing the validation procedure and establishing the validated connection.

In Example 28, the subject matter of any one or more of Examples 26-27 optionally include an IoT gateway, comprising communications circuitry and processor circuitry, the IoT gateway in communication with the first IoT device and the second IoT device, and configured to enable device discovery and device-to-device communications via a local area network.

In Example 29, the subject matter of any one or more of Examples 26-28 optionally include a remote server to operate the first remote service, the remote server comprising processor circuitry and at least one memory device, the first remote service configured to perform operations as the first remote service and the first IoT device operate in a first service domain, and as the second remote service and the second IoT device operate in a second service domain.

In Example 30, the subject matter of any one or more of Examples 26-29 optionally include the respective processor circuitry being configured to perform any of the operations of Examples 13 to 24.

Example 31 is an apparatus, comprising: means for performing communications with an IoT device and performing communications with a first remote service associated with the apparatus; means for obtaining information, from the IoT device, to enable communications with a second remote service associated with the IoT device via the first remote service; means for providing the information to the first remote service, wherein the information enables the first remote service to initiate a validation procedure with the second remote service; means for obtaining service validation information from the IoT device, wherein the service validation information is provided from the second remote service to the IoT device in response to the validation procedure; and means for providing the service validation information to the first remote service, to enable a validated connection between the first remote service and the second remote service to communicate data or commands between the apparatus and the IoT device via the first and second remote services.

In Example 32, the subject matter of Example 31 optionally includes means for providing a command to the IoT device, via the first remote service and the second remote service, by communicating the command to the first remote service, wherein, in response to communicating the command, the command is further communicated from the first remote service to the second remote service and from the second remote service to the IoT device, using the validated connection between the first remote service and the second remote service.

In Example 33, the subject matter of any one or more of Examples 31-32 optionally include means for obtaining a data value from the IoT device, via the first remote service and the second remote service, by a request for the data value provided to the first remote service, wherein, in response to the request for the data value, the request is further communicated from the first remote service to the second remote service and from the second remote service to the IoT device, and is returned from the IoT device to the second remote service and to the first remote service, using the validated connection between the first remote service and the second remote service.

In Example 34, the subject matter of any one or more of Examples 31-33 optionally include subject matter where the first remote service is hosted in a first cloud network associated with a first entity, and wherein the second remote service is hosted in a second cloud network associated with a second entity, wherein the apparatus is associated with the first entity, and wherein the IoT device is associated with the second entity.

In Example 35, the subject matter of Example 34 optionally include subject matter where the apparatus is manufactured by or serviced on behalf of the first entity, and wherein the IoT device is manufactured by or serviced on behalf of the second entity.

In Example 36, the subject matter of any one or more of Examples 31-35 optionally include subject matter where the first remote service further provides authentication information that accompanies data or commands to the second remote service, wherein the validated connection between the first remote service and the second remote service is established based on use of the authentication information.

In Example 37, the subject matter of any one or more of Examples 31-36 optionally include means to receive or confirm the information in response to user input, wherein the service validation information is obtained in response to user input at the IoT device.

In Example 38, the subject matter of any one or more of Examples 31-37 optionally include subject matter where the first remote service maintains a first directory of devices accessible to the second remote service, the first directory of devices including data associated with the apparatus, wherein the second remote service maintains a second directory of devices accessible to the first remote service, the second directory of devices including data associated with the IoT device, and wherein the service validation information is provided based on at least one of the first and second directory of devices.

In Example 39, the subject matter of any one or more of Examples 31-38 optionally include means for generating the communications to the first remote service to include at least one token, wherein the at least one token includes data that provides authentication information obtained from an authorization server.

In Example 40, the subject matter of any one or more of Examples 31-39 optionally include subject matter where the communications performed with the IoT device are performed via a local area network, and wherein the communications performed with the first remote service are performed via a wide area network.

In Example 41, the subject matter of Example 40 optionally include subject matter where the information from the IoT device to communicate with the second remote service, is obtained in response to discovery of the IoT device on the local area network, wherein the information obtained from the IoT device includes information to mutually authenticate permissions and establish communication link security.

In Example 42, the subject matter of any one or more of Examples 31-41 optionally include means for communicating with the IoT device according to a standard defined according to an Open Connectivity Foundation (OCF) specification.

Example 43 is at least one non-transitory machine-readable storage medium comprising instructions or stored data which may be configured into instructions, wherein the instructions, when configured and executed by processing circuitry of a computing device, cause the processing circuitry to perform any of the operations of Examples 1 to 42.

Example 44 is one or more computer-readable storage media comprising data to cause an electronic device, upon loading, execution, configuration, or provisioning of the data by one or more processors or electronic circuitry of the electronic device, to perform one or more elements of a method described in or related to any of Examples 1 to 42, or any other method or process described herein.

Example 45 is an apparatus comprising logic, modules, or circuitry to perform one or more elements of a method described in or related to any of Examples 1 to 42, or any other method or process described herein.

Example 46 is a method, technique, or process as described in or related to any of Examples 1 to 42, or portions or parts thereof Example 47 is an apparatus comprising: one or more processors and one or more computer readable media comprising instructions that, when executed by the one or more processors, cause the one or more processors to perform the method, techniques, or process as described in or related to any of Examples 1 to 42, or portions thereof Example 48 is a signal as described in or related to any of Examples 1 to 42, or portions or parts thereof.

Example 49 is a signal in a wireless network as described in or related to any of Examples 1 to 42, or as otherwise shown and described herein.

Example 50 is a method of coordinating communications in a wireless network as described in or related to any of Examples 1 to 42, or as otherwise shown and described herein.

Example 51 is a device for processing communication as described in or related to any of Examples 1 to 42, or as otherwise shown and described herein.

Example 52 is a network comprising respective devices and device communication mediums for performing any of the operations of Examples 1 to 42, or as otherwise shown and described herein.

Example 53 is a network interface card comprising circuitry, and implementing respective logic and functionality for performing any of the operations of Examples 1 to 42, or as otherwise shown and described herein.

Example 54 is a device fog implementation comprising processing nodes and computing units adapted for performing any of the operations of Examples 1 to 42, or as otherwise shown and described herein.

Example 55 is a cloud service server comprising processing nodes and computing units adapted for performing any of the operations of Examples 1 to 42, or as otherwise shown and described herein.

Example 56 is an Internet of Things (IoT) network configuration comprising respective communication links, communication circuitry, or processing circuitry for performing any of the operations of Examples 1 to 42, or as otherwise shown and described herein.

Example 57 is an edge computing system implementation comprising processing nodes and computing units adapted for performing any of the operations of Examples 1 to 42, or as otherwise shown and described herein.

Example 58 is an edge cloud computing device implementation comprising processing nodes and computing units adapted for performing any of the operations of Examples 1-25, or as otherwise shown and described herein.

Example 59 is an apparatus comprising means to implement of any of Examples 1 to 58.

Example 60 is a system to implement of any of Examples 1 to 58.

Example 61 is a method to implement of any of Examples 1 to 58.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A device, comprising:
   processing circuitry;
   communications circuitry configured to:
     perform communications with a second device; and
     perform communications with a first remote service associated with the device; and
   a memory device including instructions embodied thereon, wherein the instructions, which when executed by the processing circuitry, configure the processing circuitry to perform operations to:
     obtain information, from the second device, to communicate, with a second remote service associated with the second device;
     provide the information, from the device to the first remote service, wherein in response to the information the first remote service initiates a validation procedure with the second remote service;
     obtain service validation information from the second device, wherein the service validation information is provided from the second remote service to the second device in response to the first remote service initiating the validation procedure with the second remote service; and
     provide the service validation information from the device to the first remote service, wherein the service validation information is used by the first remote service to enable a validated connection between the first remote service and the second remote service, wherein the validated connection is established to communicate data or commands between the device and the second device via the first and second remote services.

2. The device of claim 1, the instructions further to configure the processing circuitry to perform operations to:
   provide a command from the device to the second device, via the first remote service and the second remote service, by communicating the command from the device to the first remote service, wherein, in response to communicating the command, the command is further communicated from the first remote service to the second remote service and from the second remote service to the second device, using the validated connection between the first remote service and the second remote service.

3. The device of claim 1, the instructions further to configure the processing circuitry to perform operations to:
   obtain a data value from the second device, via the first remote service and the second remote service, by communicating a request for the data value from the device to the first remote service, wherein, in response to the request for the data value, the request is further communicated from the first remote service to the second remote service and from the second remote service to the second device, and is returned from the second device to the second remote service and to the first remote service, using the validated connection between the first remote service and the second remote service.

4. The device of claim 1, wherein the first remote service is hosted in a first cloud network associated with a first entity, and wherein the second remote service is hosted in a second cloud network associated with a second entity, wherein the device is associated with the first entity, and wherein the second device is associated with the second entity.

5. The device of claim 4, wherein the device is manufactured by or serviced on behalf of the first entity, and wherein the second device is manufactured by or serviced on behalf of the second entity.

6. The device of claim 1, wherein the first remote service further provides authentication information that accompanies data or commands to the second remote service, wherein the validated connection between the first remote service and the second remote service is established based on use of the authentication information.

7. The device of claim 1, wherein the information is provided to the first remote service in response to user input received at the device, and wherein the service validation information is provided to the device in response to user input at the second device.

8. The device of claim 1,
wherein the first remote service maintains a first directory of devices accessible to the second remote service, the first directory of devices including data associated with the device,
wherein the second remote service maintains a second directory of devices accessible to the first remote service, the second directory of devices including data associated with the second device, and
wherein the service validation information is provided based on at east one of the first and second directory of devices.

9. The device of claim 1, wherein communications from the device to the first remote service include at least one token, wherein the at least one token includes data that provides authentication information obtained from an authorization server.

10. The device of claim 1, wherein the communications performed with the second device are performed via a local area network, and wherein the communications performed with the first remote service are performed via a wide area network.

11. The device of claim 10, wherein the operations to obtain the information from the second device to communicate with the second remote service, are performed in response to discovery of the second device on the local area network, wherein the information obtained from the second device includes information to mutually authenticate permissions and establish communication link security.

12. The device of claim 1, wherein the device and the second device communicate according to a standard defined according to an Open Connectivity Foundation (OCF) specification, and wherein the communications performed by the operations occur according to asynchronous messages between respective devices and services.

13. At least one non-transitory machine-readable storage device comprising instructions stored thereupon for establishing communications in an Internet of Things (IoT) device deployment, wherein the instructions, when executed by processing circuitry of an apparatus, cause the processing circuitry to:
obtain information, from a second IoT device, to communicate with a second remote service associated with the second IoT device;
provide the information to a first remote service, wherein in response to the information the first remote service initiates a validation procedure with the second remote service;
obtain service validation information from the second IoT device, wherein the service validation information is provided from the second remote service to the second IoT device in response to the validation procedure; and
provide the service validation information to the first remote service, to enable a validated connection between the first remote service and the second remote service to communicate data or commands between the IoT device and second IoT device via the first and second remote services.

14. The machine-readable storage device of claim 13, the processing circuitry further configured to:
provide a command from the IoT device to the second IoT device, via the first, remote service and the second remote service, by communicating the command from the IoT device to the first remote service, wherein, in response to communicating the command, the command is further communicated from the first remote service to the second remote service and from the second remote service to the second IoT device, using the validated connection between the first remote service and the second remote service.

15. The machine-readable storage device of claim 13, the processing circuitry further configured to:
obtain a data value from the second IoT device, via the first remote service and the second remote service, by communicating a request for the data value from the IoT device to the first remote service, wherein, in response to the request for the data value, the request is further communicated from the first remote service to the second remote service and from the second remote service to the second IoT device, and is returned from the second IoT device to the second remote service and to the first remote service, using the validated connection between the first remote service and the second remote service.

16. The machine-readable storage device of claim 13, wherein the first remote service is hosted in a first cloud network associated with a first entity, and wherein the second remote service is hosted in a second cloud network associated with a second entity, wherein the IoT device is associated with the first entity, and wherein the second IoT device is associated with the second entity.

17. The machine-readable storage device of claim 16, wherein the IoT device is manufactured by or serviced on behalf of the first entity, and wherein the second IoT device is manufactured by or serviced on behalf of the second entity.

18. The machine-readable storage device of claim 13, wherein the first remote service further provides authentication information that accompanies data or commands to the second remote service, wherein the validated connection between the first remote service and the second remote service is established based on use of the authentication information.

19. The machine-readable storage device of claim 13, wherein the information is provided to the first remote service in response to user input received at the IoT device, and wherein the service validation information is provided to the IoT device in response to user input at the second IoT device.

20. The machine-readable storage device of claim 13,
wherein the first remote service maintains a first directory of devices accessible to the second remote service, the first directory of devices including data associated with the IoT device,
wherein the second remote service maintains a second directory of devices accessible to the first remote service, the second directory of devices including data associated with the second IoT device, and
wherein the service validation information is provided based on at least one of the first and second directory of devices.

21. The machine-readable storage device of claim 13, wherein communications from the IoT device to the first remote service include at least one token, wherein the at least one token includes data that provides authentication information obtained from an authorization server.

22. The machine-readable storage device of claim 13, wherein the communications performed with the second IoT device are performed via a local area network, and wherein the communications performed with the first remote service are performed via a wide area network.

23. The machine-readable storage device of claim 22, wherein operations to obtain the information from the second IoT device to communicate with the second remote service, are performed in response to discovery of the second IoT device on the local area network, wherein the information obtained from the second IoT device includes information to mutually authenticate permissions and establish communication link security.

24. The machine-readable storage device of claim 13, wherein the IoT device and the second IoT device communicate according to a standard defined according to an Open Connectivity Foundation (OCF) specification, and wherein the communications occur according to asynchronous messages between respective devices and services.

* * * * *

UNITED STATES PATENT AND TRADEMARK OFFICE
CERTIFICATE OF CORRECTION

PATENT NO. : 11,438,422 B2
APPLICATION NO. : 17/424116
DATED : September 6, 2022
INVENTOR(S) : McCall et al.

Page 1 of 1

It is certified that error appears in the above-identified patent and that said Letters Patent is hereby corrected as shown below:

In the Claims

In Column 30, Lines 30-31, in Claim 1, delete "communicate," and insert --communicate-- therefor In Column 31, Line 43, in Claim 8, delete "east" and insert --least-- therefor In Column 32, Line 28, in Claim 14, delete "first," and insert --first-- therefor Signed and Sealed this
Twenty-seventh Day of June, 2023

Katherine Kelly Vidal
*Director of the United States Patent and Trademark Office*